United States Patent [19]

Johnson

[11] Patent Number: 5,753,808
[45] Date of Patent: May 19, 1998

[54] SELF-COMPENSATING ROLLING WEIGHT DEFLECTOMETER

[75] Inventor: Roger F. Johnson, Bellevue, Wash.

[73] Assignee: Quest Integrated, Inc., Kent, Wash.

[21] Appl. No.: 526,486

[22] Filed: Sep. 11, 1995

[51] Int. Cl.[6] ................................................ E01C 23/00
[52] U.S. Cl. ........................................ 73/146; 73/800
[58] Field of Search ........................ 73/146, 800; 356/376

[56] References Cited

U.S. PATENT DOCUMENTS

| | | |
|---|---|---|
| 3,499,320 | 3/1970 | Fox et al. . |
| 4,231,160 | 11/1980 | Johnson et al. . |
| 4,473,319 | 9/1984 | Spangler . |
| 4,571,695 | 2/1986 | Elton et al. . |
| 4,653,316 | 3/1987 | Fukuhara ................... 73/146 |
| 4,691,565 | 9/1987 | Theurer . |
| 4,899,296 | 2/1990 | Khattak ..................... 73/146 |
| 4,978,246 | 12/1990 | Quenzi et al. . |
| 5,046,366 | 9/1991 | Basson et al. . |
| 5,129,803 | 7/1992 | Nomura et al. . |
| 5,163,319 | 11/1992 | Spies et al. ................. 73/146 |
| 5,288,167 | 2/1994 | Gaffard et al. . |
| 5,331,745 | 7/1994 | Jager . |
| 5,440,923 | 8/1995 | Arnberg et al. .............. 73/146 |

*Primary Examiner*—George M. Dombroske
*Assistant Examiner*—Max H. Noori
*Attorney, Agent, or Firm*—Christensen O'Conner Johnson & Kindness PLLC

[57] ABSTRACT

A rolling weight deflectometer for monitoring deflection of pavement under load. The deflectometer incorporates an alignment laser beam emitter that measures vertical displacement of each of a plurality of distance sensors mounted on a horizontal sensor bearer member that bends or vibrates as it is transported over a pavement for deflection measurement. The measured vertical displacements, due to member bending, allow the deflectometer to compensate for errors introduced by member bending and thereby provide a more accurate measurement of pavement deflection.

16 Claims, 10 Drawing Sheets

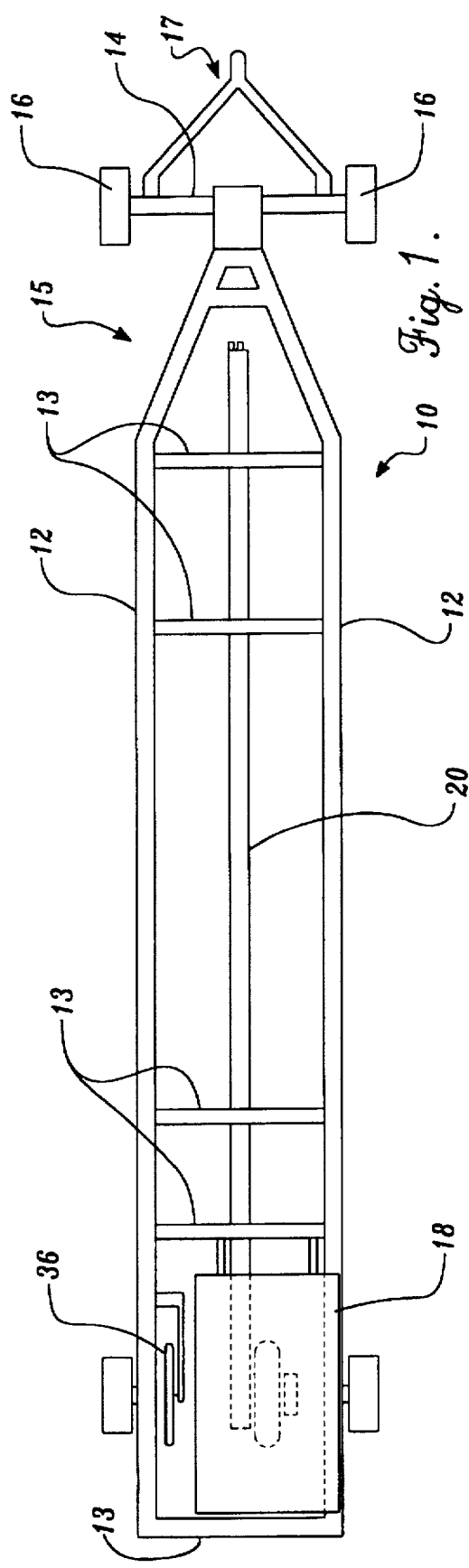
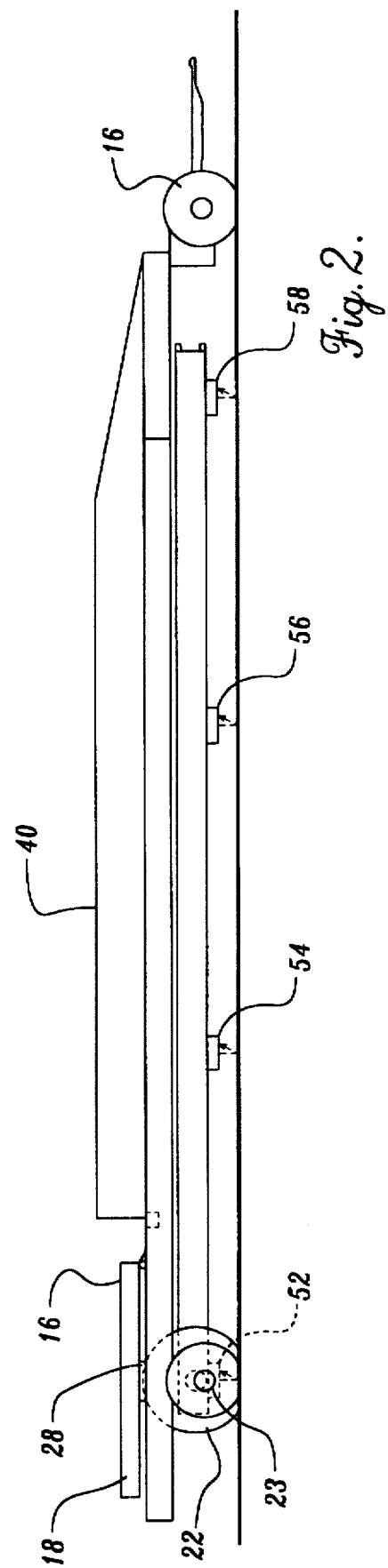

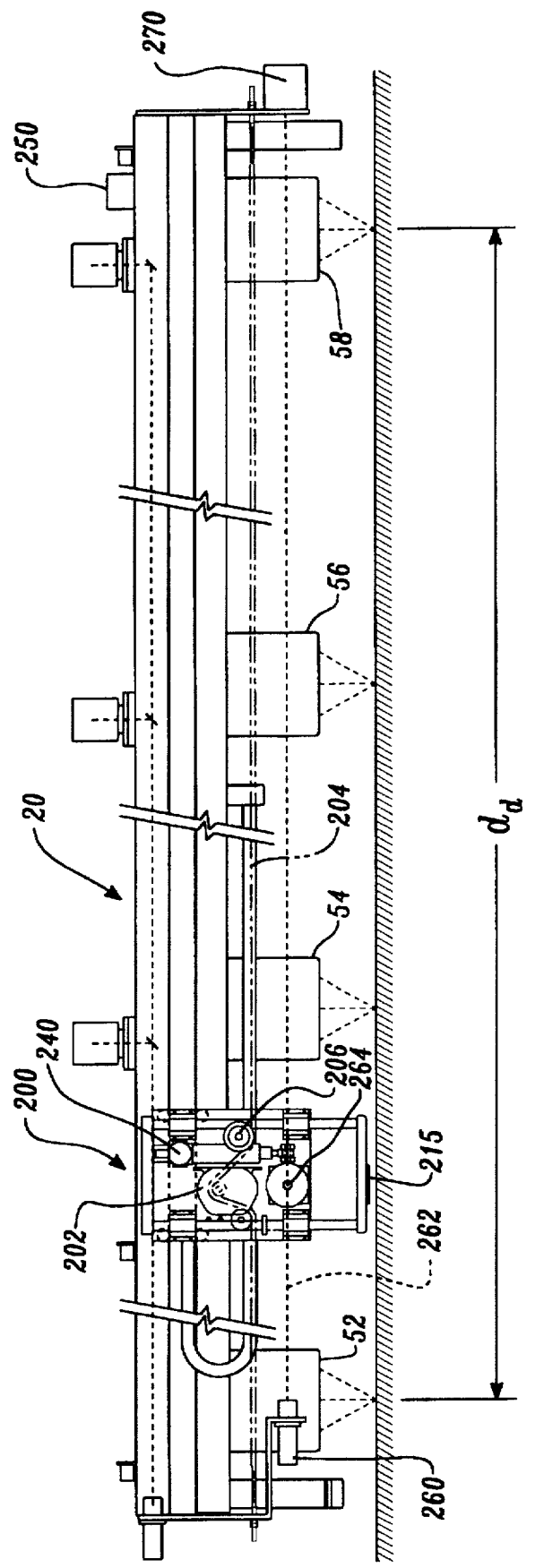

SELF-COMPENSATING ROLLING WEIGHT DEFLECTOMETER

FIELD OF THE INVENTION

The invention relates to devices and methods for measuring the strength of pavement, especially concrete or asphalt pavement, by measuring its deflection under a known load. More particularly, the invention provides a rolling weight deflectometer, and measurement system for such a deflectometer, that compensates for inaccuracies in deflection measurements introduced by bending of a horizontal beam on which deflection sensors are mounted, thereby allowing more accurate measurement of pavement deflection under load.

BACKGROUND OF THE INVENTION

In order to determine pavement condition for airport runways or highways, the load bearing capability of the pavement is periodically tested. Load bearing capability may deteriorate, over time, due to a number of factors, including changes in the elastic moduli of subpavement layers of earth. Thus, when subpavement earth layers subside or swell, their moduli are altered and affect the stability and load bearing capability of an overlying pavement. In order to measure the load bearing capability of the pavement, it is desirable to utilize technologies that are nondestructive so that the integrity of the pavement layer is maintained. Further, the measurements should desirably be made rapidly, through an automated system, to minimize time and reduce costs.

A rolling weight deflectometer may be used to continuously measure the deflection of a pavement. A device of this type is disclosed in U.S. Pat. No. 4,571,695. In essence, a load is placed on a wheel that rolls across the pavement and the depth of a deflection basin created by the loaded wheel is measured using precision laser sensors mounted on a horizontal member that tracks with the wheel. Such deflection measurements provide insight into the load bearing capability of the pavement. However, pavement deflections are usually very small, typically 0.010 to 0.040 inch for a 20,000 pound applied load. Therefore, not only are extremely sensitive sensors required to measure the deflection, but the sensors should have a stable reference plane. The deflectometer of the '695 patent fails to meet both of these requirements, as will be explained below.

FIG. 3 is a schematic representation of a rolling weight deflectometer, showing a member 20, a load wheel 22, and the pavement sensors 52, 54, 56, and 58. The upper schematic of FIG. 3 shows the horizontal bearing member at a first position on the pavement at time $t_1$, while the lower schematic shows the member at a second position at time $t_2$. The direction of travel of the member is indicated by an arrow and the amount of travel is metered by a "fifth wheel" (not shown). The reading or sampling control system of the apparatus is dependent upon the amount of rotation of the fifth wheel or odometer which sends electrical pulses to a computer to trigger the taking of measurements by the sensors. Thus, the pavement sensors are activated to take measurements at a spacing equal to the sensor separation distance. Sensor 52 measures that part of the depression basin formed that extends vertically below the sensor at $P_1$. This is not the exact maximum point of deflection, which should be directly beneath the center of load wheel 22. However, since the sensor is mounted as close as possible to a side of the wheel (typically, about 5 to 9 inches from the center of the wheel), the error introduced is acceptable.

Likewise, equidistantly spaced sensors 54, 56, and 58 measure distances to points $P_2$, $P_3$, and $P_4$, respectively. After the trailer has moved forward by one sensor separation distance, the sampling control system is again activated by the rotation of the odometer wheel. Load wheel 22 has now moved so that a line drawn vertically through the axis of the sensor 52 passes through the point $P_2$ (in a statistical sense), where sensor 54 was previously positioned. Likewise, sensors 54, 56, and 58 have moved horizontally in the same direction for the same distance, so that sensor 54 is directly above $P_3$, sensor 56 is directly above $P_4$, and sensor 58 is directly above a new point, $P_5$. Thus, it is clear that a reading will be taken at each $P_n$ by the deflection basin measuring sensor 52, and each of the other sensors 54, 56, and 58, in a statistical sense. This assumes that the odometer wheel is accurate and precise, and that the trailer is traveling in a straight line.

FIG. 4 is a schematic showing the determination of the height of a point $P_i$ on pavement P above or below a horizontal theoretical datum line L. As shown, distance sensors 54, 56, and 58 are equally spaced. Sensor 54 is a distance C from a point $P_c$ vertically beneath the sensor on the pavement. Likewise, sensors 56 and 58 are distances B and A, respectively, from points $P_b$ and $P_a$ on the pavement. As for the description of FIG. 3, when the beam 20 is moved in the direction of travel indicated by the arrow, the odometer wheel (not shown) rotates and a second reading is taken such that sensor 52 (not shown), equally spaced from and left of sensor 54 and located nearest the load wheel, is a distance C' directly above $P_c$. Likewise, sensor 54 is above point $P_b$, sensor 56 is above point $P_a$, and sensor 58 has moved a distance to be above a new point (not shown). Thus, sensor 52 detects deflection of the pavement at statistically the same location where the unloaded pavement was measured by sensor 54. By continuing the pavement traversal process, sensor 52 measures statistically the same pavement, under load conditions, as measured by sensors 54, 56 and 58 under no load conditions.

The geometry of undeflected pavement is determined using leading sensors 54, 56, and 58, which are, in this example, equally spaced apart. Referring to FIG. 4, the point of contact $P_b$ of a laser beam from central sensor 56 with the pavement is at a measured distance B. A line is projected from $P_a$, a point of contact of a laser beam from sensor 58 through $P_b$, to intersect a laser beam extending vertically from sensor 54 to the pavement at point $P_i$. The distance that $P_a$ is below the datum line L, is given by (A−B). Similarly, from geometry, this distance (A−B) between point $P_i$ and the datum line L is reproduced. However, this does not account for the distance between the datum line L and $P_c$. Thus, h is defined as the distance between $P_c$ and $P_i$ and is called a "virtual height." Since sensors 54 and 58 are at equal elevation above datum line L, the following equality holds:

$$A-(A-B)=C-h+(A-B) \qquad (I)$$

This equation simplifies to:

$$h=A-2B+C \qquad (II)$$

In order to determine pavement deflection, the geometry of a second measurement, subject to the load wheel, is determined using sensors 52, 54, and 56. In this instance, the distance between sensors 52 and 54 may not be equal to the distance between sensors 54 and 56 and 56 to 58. The use of unequal distances between sensors allows the construction of a more compact rolling weight deflectometer. The following derivation of pavement deflection δ is based on a rolling weight deflectometer where the distances between sensors 52 and 54; 54 and 56 are each different. But, the distance between sensors 54 and 56, and sensors 56 and 58 are equal. To calculate the virtual height h', the same analysis as above is applied. Measured distances B, C, and D extend from sensors 56, 54, and 52, respectively, to the pavement surface directly beneath the sensors. The beams from sensors 56, 54, and 52 contact the pavement P at points $P_b$, $P_c$, and $P_d$, respectively. A theoretical straight line is projected from $P_b$ through $P_c$ to intersect the vertical laser beam emitted from sensor 52 (the sensor axis of sensor 52) at point $P_n$. The distance from $P_b$ to the theoretical horizontal datum line L is (B−C). By the geometry of similar triangles, the distance between the datum line L and $P_n$ is (n/m)(B−C). We can equate the elevation of the sensors:

$$B-(B-C)=D-h'+((n/m)(B-C)) \qquad (III)$$

or, simplifing $$h'=(n/m)B-(1+(n/m))C+D \qquad (IV)$$

where (n/m) is always greater than or equal to 1, and depends upon the relative spacing between the sensors.

Pavement deflection δ is then determined as:

$$h-h'=\delta \qquad (V)$$

Aside from the factors discussed above, errors may be introduced into the h and h' calculations by thermal deformation of member 20. A member 20 of thickness H, thermal coefficient of expansion γ, and subject to temperature differential ΔT across its thickness, will be bent into a radius of curvature R, where:

$$R=\frac{H}{\gamma \Delta T}$$

The deflection, d, at the center of the member of length L, will be:

$$d=R-\sqrt{R^2-\frac{L^2}{4}}$$

If R is very much larger than L, then this simplifies to:

$$d=\frac{L^2 \gamma \Delta T}{8H}$$

For a member that is a steel beam 30 feet long with $\gamma=11\times10^{-6}$ per °C, and H=10 inches, the thermal deflection is 0.018 inches/°C.

Since the deflections are typically in the range 0.015 to 0.040 inch for 20,000 pound loads, the thermally induced effect is about 50% of the maximum expected deflection.

Vibrational bending has similar deleterious effects on accuracy of deflection measurements. Vibration can be viewed as a dynamic type of member bending where member displacement varies with time. The actual effects are complex to model, but it is expected that the distance sensors would not each be displaced by the same distance from their horizontal alignment with each other.

Despite the sophistication and ease of use of the rolling weight deflectometer, the apparatus has inherent flaws that lead to significant errors in pavement deflection measurements. Measurements are based on several assumptions, including that the horizontal member remains absolutely straight and steady at all times. However, the horizontal member may bend due to thermal effects, despite sunshading, and may vibrate as the member is transported. Member bending introduces significant errors since pavement deflection is usually quite small, member bending effects are often large relative to actual pavement deflection. Also, it is assumed that the deflectometer tracks in a sufficiently straight line so that successive pavement distance sensors "see" the same spots on the pavement in deflected and undeflected condition. In practice, this assumption may not hold.

There exists a need for a rolling weight deflectometer that compensates for sensor bearer member bending to provide more accurate measurements of pavement deflection under load. Further, the deflectometer should have all of the advantages of present rolling weight deflectometers, namely, ease of use, mobility, high sampling rate, and continuous operation to reduce the time and cost of taking measurements, as well as operator exposure to traffic. The deflectometer should also have built-in compensation for out-of-perfect straight line tracking of the trailer.

SUMMARY OF THE INVENTION

The invention provides a rolling weight deflectometer and a control system that automatically compensates for sensor bearer member bending, including dynamic member bending, thereby providing more accurate measurements of pavement deflection under an applied load. The deflectometer also includes a laser beam distance sensing system that monitors straight line deflectometer traversal of pavement.

The rolling weight deflectometer of the invention includes a mobile trailer wherein is mounted a rigid elongate horizontal sensor bearer member, with its longitudinal axis parallel to that of the trailer. A load-bearing platform is mounted near a rear end of the trailer, such that a load placed on the platform is transferred to a load bearing wheel, rotatably mounted at the rear of the trailer, in the vicinity of the load bearing platform. A plurality of precision laser pavement distance sensors are mounted at predetermined distances from each other on the member. The sensors are each adapted to measure the distance from the sensor to the pavement being tested. One of the sensors is mounted on the member near the load-bearing wheel to measure the depth of a deflection basin in the pavement caused by the wheel. Other sensors measure the undeflected pavement.

According to the invention, an alignment laser beam emitter is mounted near a forward end of the bearing member, remote from the load platform, and directs a reference laser beam along the length of the member. A plurality of optical beamsplitters, one mounted in the vicinity of each of the pavement sensors, are aligned to intercept the reference laser beam emitted from the alignment laser beam emitter. A portion of the reference beam is transmitted from each of the beamsplitters while the reflected portion is deflected to a beam straightness sensor for measurement of the amount of displacement of the straightness sensor from the reference laser beam and hence a determination of the vertical displacement of the member due to bending. An electronic programmable digital signal processor calculates the amount of bending of the horizontal member and adjusts or corrects the measurements taken by the pavement distance sensors to compensate for the errors introduced by member bending.

Each of the distance sensors, according to the invention, emits a beam that forms an elliptical spot with an axis about one inch (25 mm) in line of travel of the deflectometer and about two inches (50 mm) perpendicular to the line of travel. Further, in accordance with the invention, each distance sensor uses a dual symmetric optical triangulation approach to distance measuring combined with the large laser footprint. As a result of the large footprint, the deflectometer distance readings are less sensitive to minor out-of-straight-line tracking errors of the deflectometer. The invention also incorporates a method for detecting when out-of-straight-line tracking is taking place.

By providing an apparatus and system of compensating for sensor bearer member bending, or displacement, from a straight line alignment, and reducing sensitivity to out-of-straight-line tracking, the invention allows significant improvement in the accuracy of pavement deflection measurements and better prediction of pavement load bearing capacity.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying schematic drawings, none to scale, wherein:

FIG. 1 is a schematic top view of an embodiment of a rolling weight deflectometer;

FIG. 2 is a schematic side view of the deflectometer of FIG. 1;

FIG. 10 is a partial schematic side view of an embodiment of a rolling weight deflectometer of the invention showing an attached calibration carriage;

DETAILED DESCRIPTION OF THE PREFERRED EMBODIMENT

Figure 3:
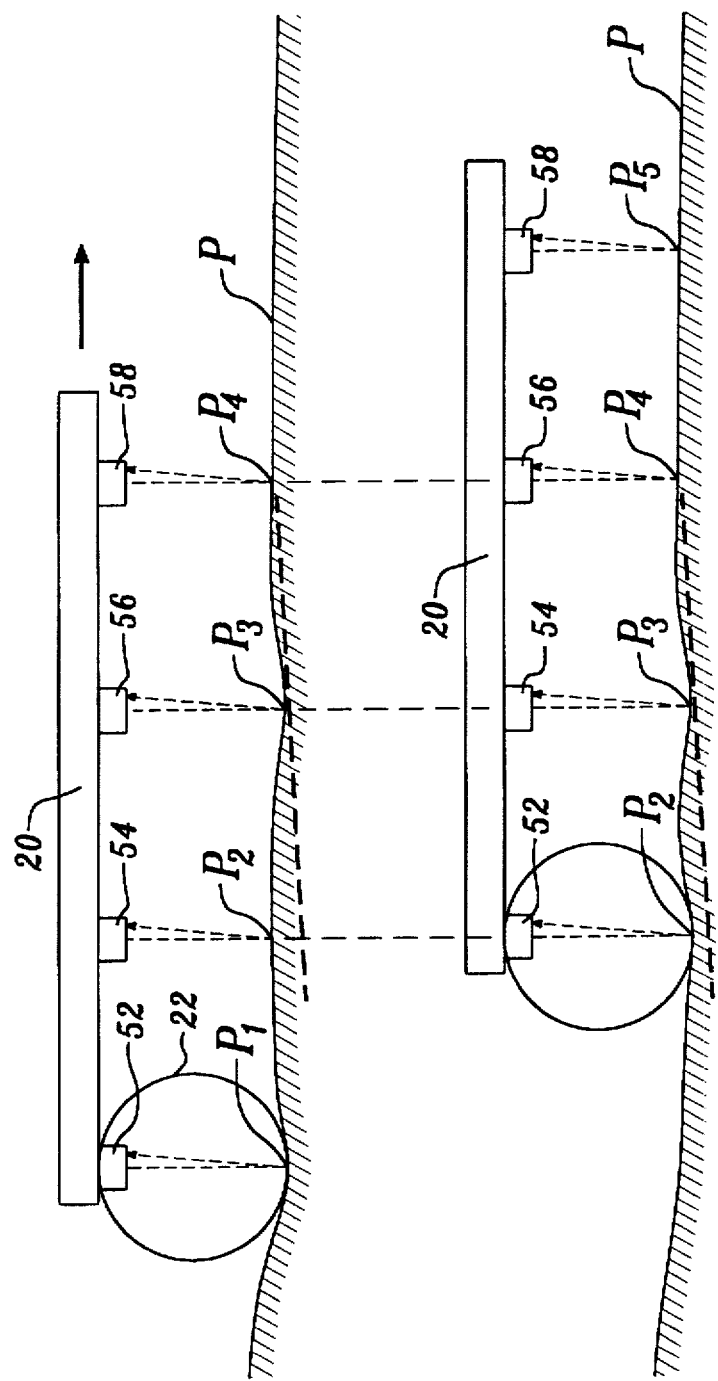
FIG. 3 is a schematic diagram illustrating principles of deflectometer operation.
Figure 4:
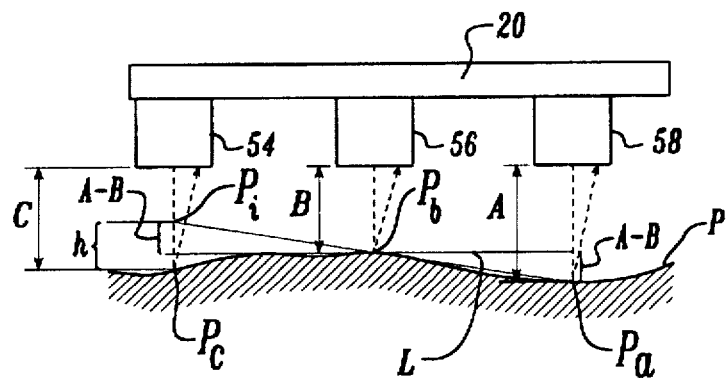
FIG. 4 is a schematic diagram illustrating principles of deflectometer operation.
Figure 5:
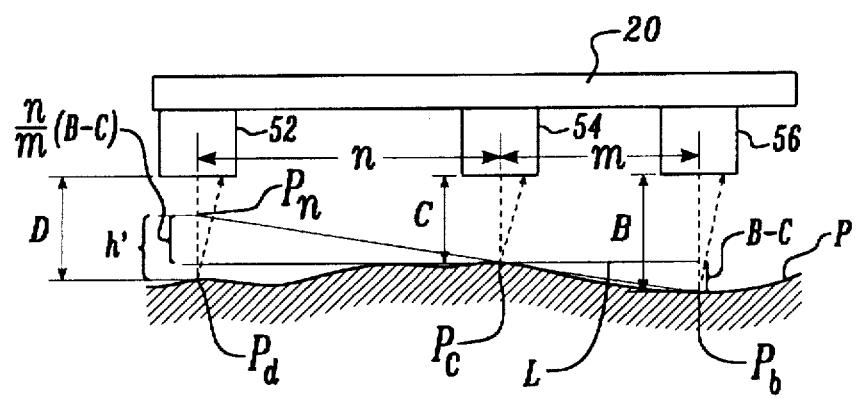
FIG. 5 is a schematic diagram illustrating principles of deflectometer operation.

The invention provides a rolling weight deflectometer that compensates for the bending of a longitudinally extending, rigid, bearing member to which is mounted laser sensors for measuring the distance to a pavement, and consequently the degree of deflection of the pavement when it is subjected to a load transmitted by a load-bearing wheel. The deflection of pavement under the loaded wheel provides a measure of the condition of the pavement.

FIGS. 1 and 2 illustrate an exemplary rolling weight deflectometer. A mobile longitudinal support trailer 10 includes two parallel elongate support rails 12, interconnected at intervals with crossmembers 13 to form a ladder-like structure. At a forward end of the trailer, rails 12 converge to form a V-shaped structure 15 that is supported on an axle 14 supplied with wheels 16 at each end thereof. A trailer hitch 17 for towing the trailer is mechanically coupled to axle 14. At the opposite end of the trailer 10 is mounted a load platform 18. A load placed on load platform 18 is effectively transferred to axle 23, and thence to the load wheel 22. An odometer wheel 36 is rotatably mounted inside the frame of trailer 10 between support rails 12 and in the vicinity of load wheels 22 so that the wheel is in continuous contact with the pavement that the trailer traverses.

A rigid horizontal elongate member 20, usually metal of I-shaped or box-shaped cross-section, is mounted centrally in the trailer between and substantially parallel to support rails 12, in a suspended mount from cross ties 13. The member is of sufficient length to extend from the load axle 23 toward the forward end of the trailer so that pavement locations directly beneath a forward portion of the member are substantially unaffected by a deflection basin formed beneath load wheel 22. Four pavement sensors 52, 54, 56, and 58 are fixedly mounted to member 20, and are spaced apart at known intervals, such as the equal intervals shown. Pavement sensor 52 is positioned near axle 23 to measure the depth of a deflection basin formed when a line of contact of a load wheel 22, typically a standard aircraft wheel, passes over a section of pavement. Pavement sensors 54, 56 and 58 are positioned on a portion of member 20 sufficiently far from axle 23 so that their measurements are not affected by the deflection basin formed by the load wheel.

The following description gives details of the preferred embodiment of the rolling weight deflectometer of the invention, and illustrates its benefits. As explained above, the virtual heights h and h' of any point on a pavement may be calculated using equations (II) and (V). The difference, h'−h, gives the pavement deflection under load. However, when the horizontal sensor-carrying member is bent, so that the pavement sensors are not colinear when a distance measurement is made, then this introduces an error into the virtual height determinations, and consequently into the calculated pavement deflection.

Figure 6:
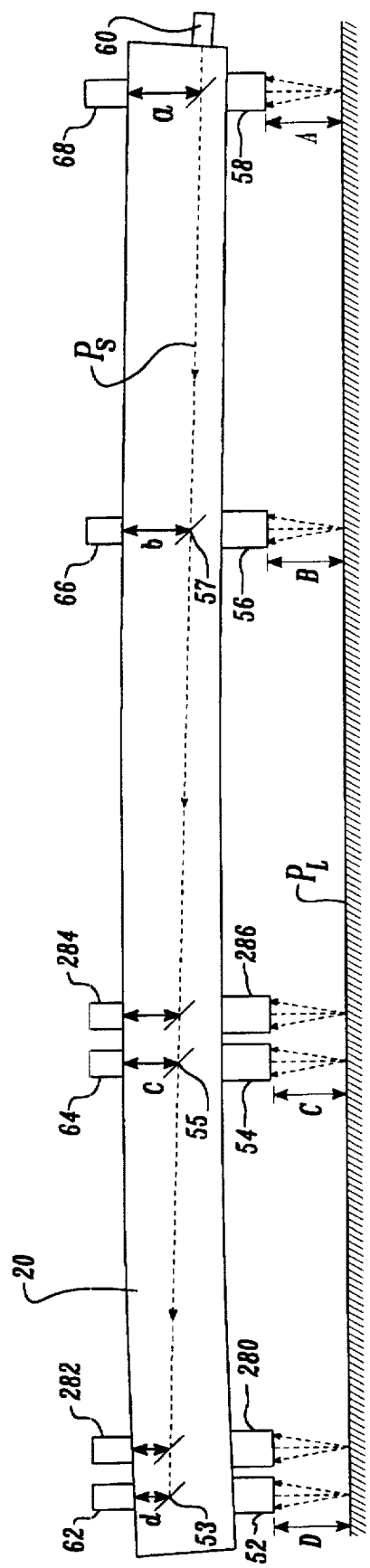
FIG. 6 is a schematic diagram of an embodiment of the invention showing the alignment laser beam emitter.
Figure 7:
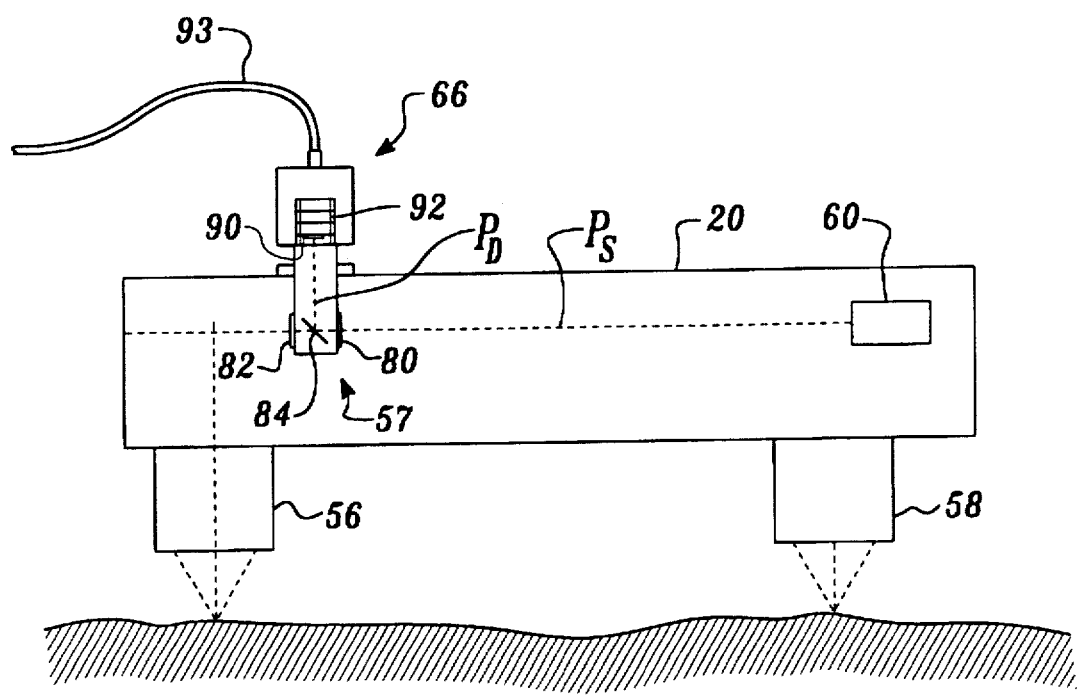
FIG. 7 is a schematic diagram illustrating pertinent details of an embodiment of the beam straightness sensors and beam deflectors of the invention for determining a bent member compensation factor.

To compensate for the error introduced into sensor distance measurements by bending of member 20, the invention provides an alignment laser emitter 60, mounted near an end of member 20 that directs a reference laser beam $P_r$ along the member, as shown in FIG. 6. Beam straightness sensors 62, 64, 66, and 68, each adapted to receive a laser beam, are mounted vertically above and aligned with each of the distance sensors 52, 54, 56, and 58, respectively. Laser beamsplitters (not shown in FIG. 6), such as 45° cube beamsplitters or pellicles, are mounted at points 53, 55, 57, and 59, to intercept and deflect a portion of the laser beam $P_r$ to each of the straightness sensors 52, 54, 56, and 58, respectively, as shown in FIG. 7. Preferably, about 15% of incident beam energy is deflected. The position of the centroid of intensity of the deflected portion of the reference laser beam is precisely measured using a lateral effect photodiode or CCD array. The deflected beam strikes a position sensitive photodetector on each of the straightness sensors, thereby providing a measurement of the displacement of each pavement distance sensor relative to the reference laser beam $P_r$. When the member 20 bends or vibrates, while the rolling weight deflectometer is in use, the spatially sensitive photodetector will move or be displaced relative to the laser beam $P_s$. This displacement causes the point of laser incidence on the photodetector of the straightness sensor to be displaced. This displacement provides a basis for compensating the measurements taken by an associated pavement sensor for movement of the horizontal member.

The member straightness sensors and laser beam deflectors useful in the invention are shown schematically in FIG. 7. A member straightness sensor 66 is mounted on longitudinal member 20. Associated with the member straightness sensor 66, is a pavement distance sensor 56, mounted to member 20 such that the distance from the laser to the middle of the pavement sensor 56 is equal to the distance from the laser to the beamsplitter 84 plus the additional distance from the beamsplitter to the surface of the position sensitive photodetector in the vicinity of the member straightness sensor. An alignment laser beam emitter 60 is mounted near a forward end of member 20, near pavement distance sensor 58. Alignment laser beam emitter 60 emits a reference laser beam $P_s$ substantially along the length of longitudinal member 20. Reference beam $P_s$ is incident upon a laser beam deflector 57 associated with member straightness sensor 66. The laser beam deflector has a window 80 aligned to receive the reference laser beam as an incident laser beam, a beamsplitter behind the window angled to reflect a portion of the incident laser beam at an angle of 90° and transmit the remainder of the laser beam through an exit window 82. The deflected portion of the reference laser beam $P_d$ strikes a horizontally mounted position sensitive photodetector 90 or CCD array at a specific point. Digital signal processing electronics 92, associated with the position-sensitive photodetector 90, convert relative lateral movement between deflected beam $P_d$ and position sensitive photodetector 90 into a distance measurement. For example, when member 20 bends so that pavement distance sensor 56 is deflected downward, reference laser beam $P_s$ is incident upon a higher point on beamsplitter 84, thereby shifting the point of incidence of deflected laser beam $P_d$ on the photodetector toward the left. This displacement toward the left is measured and converted by the digital signal processor 92 into an equivalent vertical displacement of member 20.

The error in distance measurement made by a pavement distance sensor that is introduced by bending of the member 20 is offset by adding the distance of a straightness sensor from the reference laser beam $P_s$ to the distance measured by the pavement distance sensor, associated with that straightness sensor. Thus, the effective distances to be used for each of the sensors shown in FIG. 6, and by the deflection algorithm, equation (V), are as follows:

Distance sensor 52=D+d
Distance sensor 54=C+c
Distance sensor 56=B+b
Distance sensor 58=A+a where capital letters represent the pavement distance sensor measurements and lower case letters are the straightness sensor measurements.

Clearly, reference beam $P_s$ need not be perfectly horizontal nor remain horizontal. Indeed, $P_s$ may be inclined at an angle. Since $P_s$ is a beam of light, it may be assumed that it is perfectly straight so that it serves as an invariant straight reference line. When the alignment laser beam emitter is located at or near distance sensor 58, then only sensors 52, 54, and 56 require beam straightness sensors since the distance "a" may be set at zero. The straightness sensors are preferably mounted such that the distance from laser 60 to beamsplitter 84 and thence to position-sensitive photodetector 90 is equal to the distance between corresponding pavement sensors. Thus, straightness sensors will be mounted ahead of the middle of each of the pavement sensors by a distance equal to the distance from the beamsplitter to the position-sensitive photodetector.

According to the invention, distance sensors 52, 54, 56, and 58 take measurements at a point on the pavement and virtual heights h and h' are calculated using the following equations:

$$h=(A+a)-2(B+b)+(C+c) \qquad \text{(VI)}$$

$$h'=(B+b)-2(C+c)+(D+d) \qquad \text{(VII)}$$

The difference between these virtual heights (h–h') for four equally spaced pavement distance sensors is the deflection, according to the invention.

The odometer wheel rotation activates the sampling circuit for the pavement distance sensors. Distance measurements are taken at about 1 millisecond intervals when the deflectometer travels at about 4 miles per hour At higher speeds of travel, shorter sampling intervals may be used. The laser beams from the distance sensors are about two inches (50 mm) wide perpendicular to direction of carriage travel and one inch (25 mm) in the direction of carriage travel. Typically, about 100 measurements are taken at each sampling point by each of the distance sensors, although more or less may be taken. The distance between sampling measurements may vary, depending upon the pavement being tested and speed of trailer traversal of the pavement. Typically, a distance of 0.70 inch (18 mm) traverses the pavement at a rate of about 4 mph (6 kph) at a sampling rate of ten measurements at 1 KHz.

In general, in the method of using the odometer, in accordance with the invention, the odometer wheel is first set to a starting position. When the odometer wheel has traversed a predetermined distance, set by the operator and depending upon the speed of trailer traversal of the pavement (typically about one foot (25 cm) or an integer multiple thereof), measurements are taken at each of the distance sensors. Simultaneously, the straightness sensors compensate for each of the readings taken at the pavement distance sensors, thereby allowing more accurate calculation of pavement deflection. Preferably, all readings are stored in electronic memory of the digital signal processor for subsequent retrieval and manipulation.

According to the invention, the preferred height sensors are those that operate on a principle of dual symmetric triangulation. These sensors utilize a laser beam that is collimated to an elliptical shape, with the longest axis, preferably about two inches (50 mm), perpendicular to the direction of travel of the deflectometer, and the shorter axis, preferably about one inch (25 mm) parallel to the direction of travel. Further, the device utilizes a spatially sensitive detector known as a "lateral effect photodiode." Preferably, the device has a 30° angle between the direction of incident laser light on the measured surface and the axis of the viewing lens. Both detectors and the optical systems are arranged in mirror symmetry about the incident laser beam. The dual symmetric triangulation approach may be better understood with reference to FIG. 8 which shows a schematic of an embodiment of a height sensor constructed to use these optical principles. As illustrated schematically, the pavement sensor includes a housing 100 with a window 95 on one side through which laser beams may pass. A laser beam 101 is emitted from laser emitter 94 through window 95 to the pavement surface 98. Reflected returning laser beams 102, 103, enter the window 95 and are focused through focusing lenses 114 and 112, respectively, each of the lenses being equidistantly spaced on either side of emitted laser beam 101 and having optical axes preferably at about 30° to the emitted beam, although other angles are also useful, depending on deflectometer geometry. The focused beams are then incident upon spatially sensitive photodetectors 116 and 118, located behind lenses 114 and 112, respectively. The detectors are oriented at an angle with respect to the optical axes of the lenses so that the imaged laser spot is in focus throughout the measuring range. This angle satisfies the Schiempflug condition. Preferably, the housing also contains digital signal processing electronics 97 in electrical communication with each of the photodetectors to interpret the movement of the point of incidence of a laser beam on the spatially sensitive photodetector surfaces.

Figure 8:
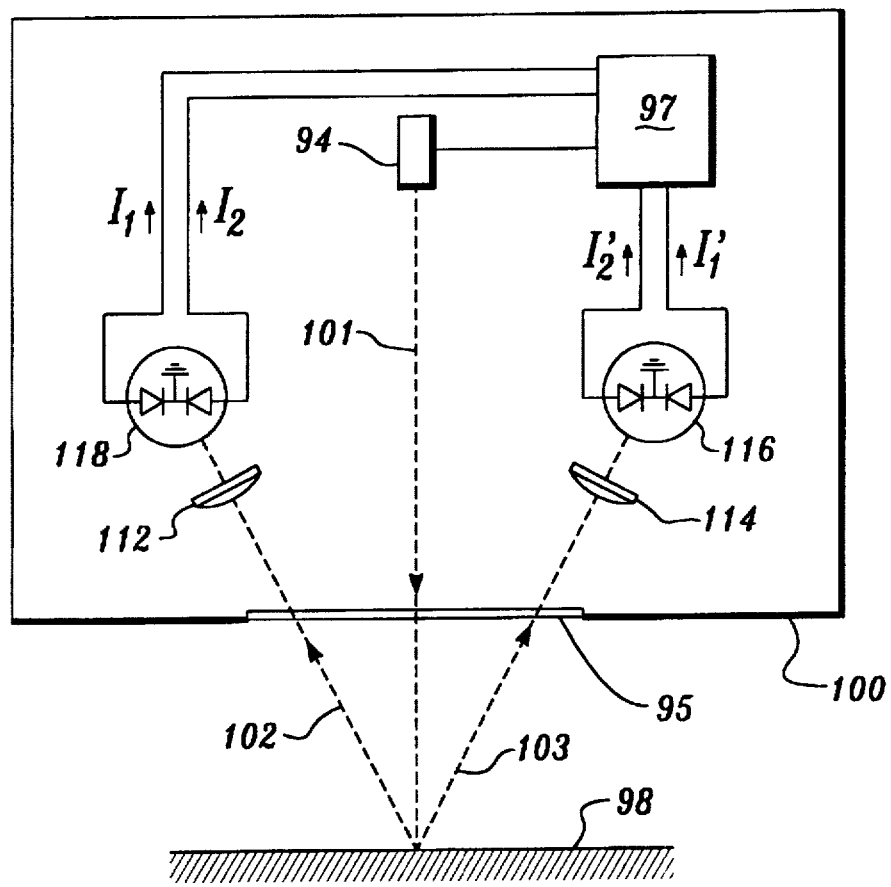
FIG. 8 is a schematic diagram of a pavement sensor showing an embodiment of the dual symmetric optical triangulation used in accordance with the invention.

The pavement height sensors of FIG. 8 operate on the principle of dual symmetric optical triangulation. The angle subtended between the emitted laser 101 and the axes of the viewing lenses is preferably approximately 30°, although angles between 10° and 60° are also useful. As explained above, imaged spots of light move across the surfaces of the photodetectors as the distance between the pavement sensor and the pavement changes. The photocurrents from detector 118, $I_1$ and $I_2$, are used to determine an uncalibrated height signal q:

$$q = \frac{I_1 - I_2}{I_1 + I_2} \quad \text{(VIII)}$$

Similarly, the photocurrents from detector 116 are used to determine another uncalibrated height signal:

$$q' = \frac{r_1 - r_2}{r_1 + r_2} \quad \text{(VIII')}$$

This eliminates the effect of surface reflectivity and laser power variations. Standard digital look-up tables and curve-fitting algorithms are used to linearize the two detector systems for height changes.

Preferably, as discussed above, the laser beam is in the form of an ellipse with a 2:1 aspect ratio with the longer dimension oriented perpendicular to the direction of rolling weight deflectometer travel. This aspect ratio, along with large dimensions of the laser beam footprint in accordance with the invention, reduces the required rolling weight deflectometer tracking accuracy.

Figure 9:
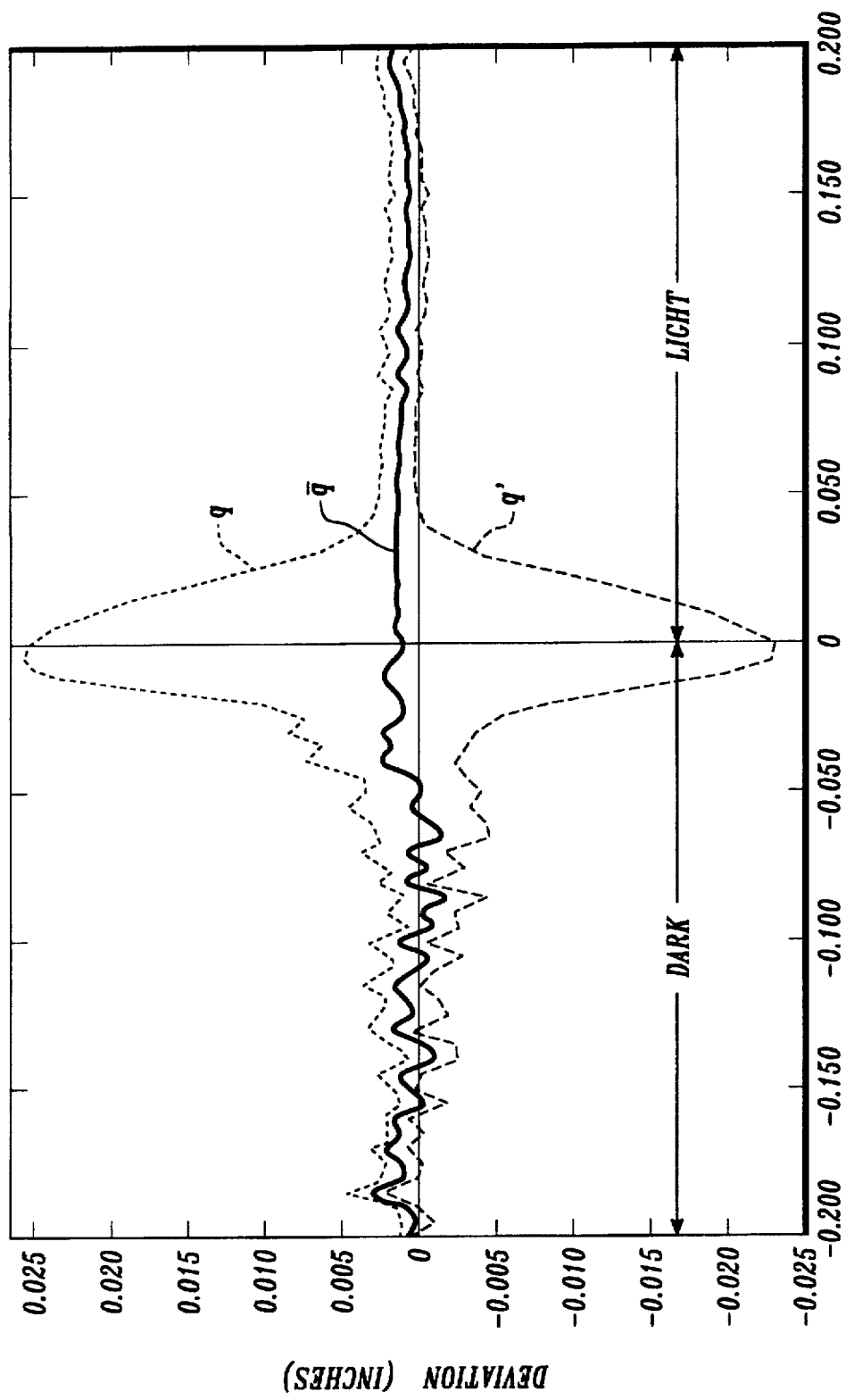
FIG. 9 is a graphical representation of contrast variation within an illuminated portion of a laser beam as imaged on two detectors using the dual symmetric optical triangulation technique.

The two detectors 118 and 116, arranged symmetrically about the laser beam, "see" the same spot on the pavement being traversed. In contrast, a triangulation sensor utilizing a single lateral effect photodiode as a position sensing detector will produce an error if the surface is not of uniform contrast. Thus, if the surface being illuminated by the laser is not of uniform contrast, then the image spot on the detector is also not of uniform contrast. The signal developed is then biased towards the brighter portion of the imaged light spot. To reduce this effect, the laser spot on the spatially sensitive photodiode is usually made very small. However, this leads to other system defects and demands, such as a need for higher sampling rates, less tolerance on rolling weight deflectometer tracking, and decreased depth of field. Adding the second symmetrical sensor, in accordance with the invention, removes height errors caused by surface contrast ambiguities and allows use of a large beam diameter. Because of symmetry, one sensor produces a larger height signal and the other produces a smaller height signal when a high contrast edge is within the footprint of an incident laser beam. The average of the two signals produces a height signal:

$$\bar{q} = (q+q')/2 \quad \text{(IX)}$$

that is relatively insensitive to surface contrast variations within the diameter of the laser beam. This effect is graphically illustrated in FIG. 9, which shows the output from each of two detectors along with the average output, when a light/dark edge was passed through the laser beam. The output uncalibrated height signal q from photodetector 118 was plotted, along with the output uncalibrated height signal q' from photodetector 116. The calculated average $\bar{q}$ was then plotted. As can be seen, the use of this technique avoid excursions in uncalibrated height readings when the sensor passes from a dark to light area of the pavement, or vice versa. The average uncalibrated height $\bar{q}$ shows little variation with pavement reflectivity. Thus, the invention's use of dual symmetric optical triangulation provides a significant advantage over prior art measuring techniques.

Other instruments, such as a charge coupled device (CCD) could also be used as the spatial detector for the pavement sensor and the beam straightness sensor. The use of a lateral effect photodiode, while preferred, is not exclusive. Due to its many pixels, a CCD sensor can sense an intensity profile of light reflected from a pavement. However, the dual symmetric optical triangulation method would still be used to cancel contrast variations which occur within the diameter of the laser beam footprint.

Figure 10A:
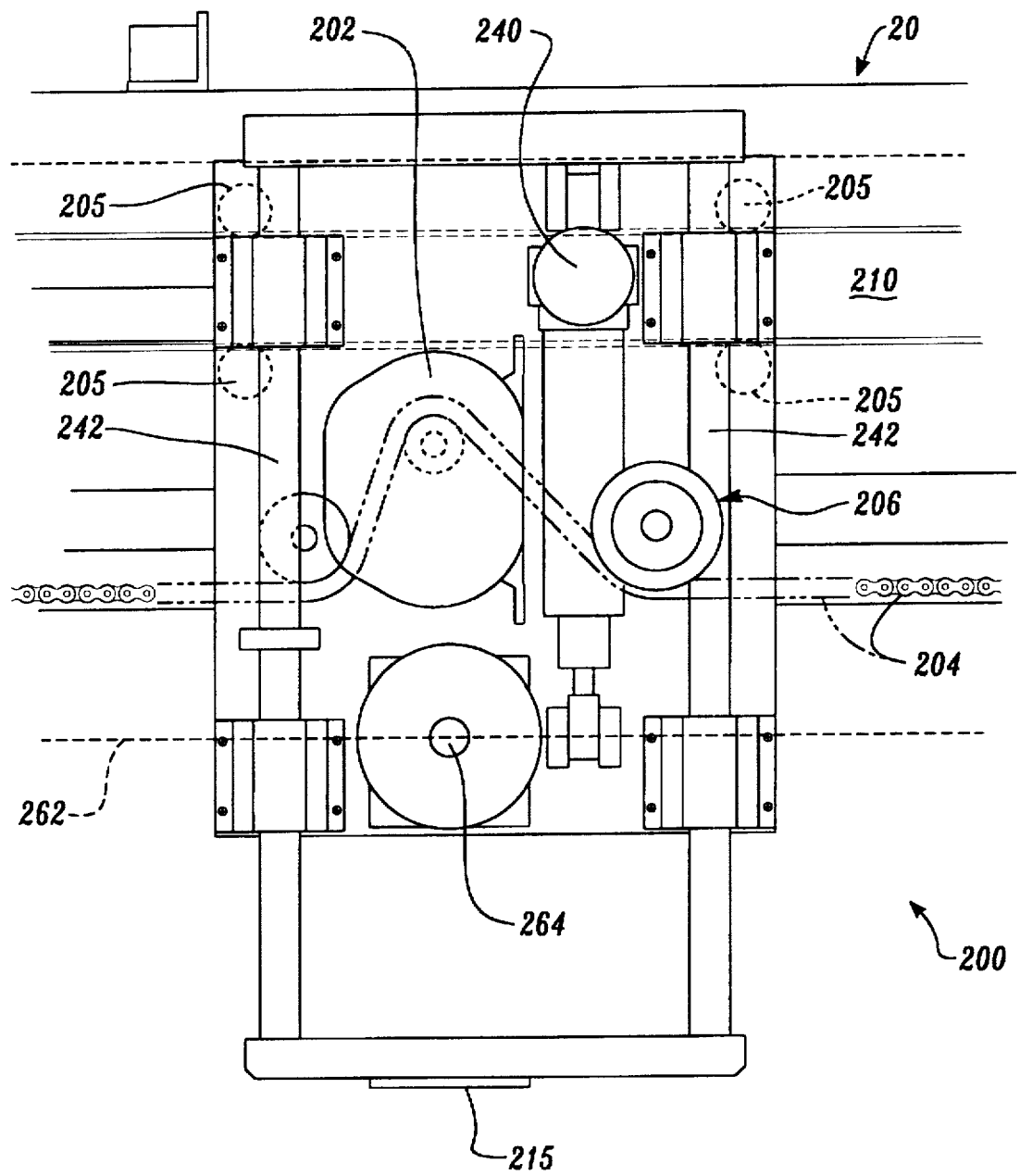
FIG. 10A is an enlarged view of the calibration carriage, showing additional detail.
Figure 10B:
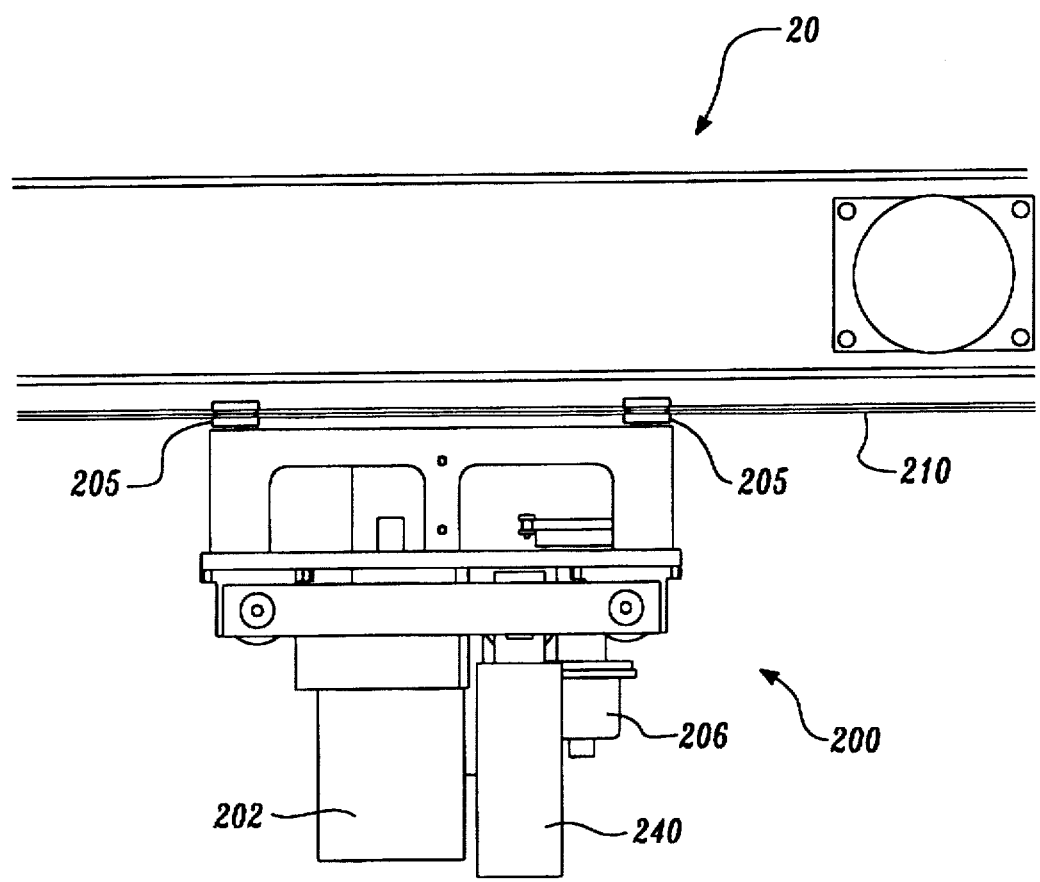
FIG. 10B is a top view of the calibration carriage, showing how it is mounted to the rolling weight deflectometer.

In another aspect of the invention, the rolling weight deflectometer is provided with a calibration system that includes a flat reference surface for pavement sensors. The establishment of such a reference surface is important for the deflection algorithm to operate successfully. It is not practicable to produce a long section of perfectly flat material, having a variation of less than 0.001 inches (25 microns) over a 15- to 30-foot member length. Thus, the invention utilizes a calibration laser beam in conjunction with a movable short section calibration plate, no larger than about the footprint of the laser beam. According to the invention, this calibration technique does not require movement of the member 20 and does not require a long flat surface. The flat calibration plate is moved successively into view of each of the pavement sensors. To achieve this, the invention provides a calibration laser emitter located at one end of the sensor-bearing member that emits a laser beam through to a beamsplitter and a position sensor mounted on the calibration carriage. As the plate is moved from one pavement sensor to another, its vertical position is monitored by storing both the position of the plate, as read by its position sensor, and the height of the plate, as read by the pavement sensor, in a digital signal processor. The lightweight calibration plate, and its beam position sensor, can be temporarily attached to each successive pavement sensor. But, it is preferred, and more convenient, to automatically move the plate using a motorized carriage 200 attached to the main member 20, as shown in FIGS. 10, 10A and 10B. The carriage is self-propelled by a motor 202, preferably using a sprocket and chain drive arrangement. The chain 204 rests in a long tray, parallel to the main member 20, and is threaded through the carriage motor drive mechanism while also driving a sprocket attached to a position encoder 206. Pulses from this encoder provide carriage position information, as will be explained below.

As can be seen from FIGS. 10, 10A and 10B, the carriage 200 has two sets of wheels 205 rotatably mounted near an upper end thereof. These wheels are each circumferentially grooved (see FIG. 10B) to engage opposing upper and lower edges of a carriage bearing rail 210. The carriage bearing rail is desirably of a rigid material that does not significantly flex under the weight of the carriage. Preferably, the bearing rail 210 is a flat metallic rail mounted fixedly to, and extending substantially along the entire length of, the main member 20.

Thus, the carriage is able to traverse the length of the carriage bearing rail 210. Optional limiting switches may be placed at extremities of the bearing rail 210 to limit the traversal of the carriage 200.

As explained above, the purpose of the calibration carriage is to provide a means for calibrating each of the pavement distance sensors. For this purpose, the calibration carriage is equipped with a flat plate 215 of adjustable height. Preferably, the plate is a flat smooth-surfaced sheet of aluminum, more preferably painted to mimic scattering and reflectivity characteristics of pavement, such as a dull gray, and devoid of surface texture. A second motor 240, mounted on the carriage 200, drives the flat calibration plate 215 into a desired height when it is positioned beneath each of the pavement sensors. The plate motor 240 controls the concerted reciprocal movement of a pair of linear guides 242 that are fixedly attached to the plate thereby adjusting the position of the flat plate, upwardly and downwardly, until a desired plate position is obtained. Preferably, the motorized carriage may be stowed when not in use.

The invention also provides a method for compensating the pavement sensor calibration for errors introduced by the weight of the calibration carriage. In a first method, a calibration alignment laser is temporarily mounted on the ground. The calibration method explained below uses the following notation:

A, B, C and D are the distance measurements from the pavement sensors 58, 56, 54, and 52, respectively;

b, c and d are the distance values from the straightness sensors;

$I_a$ is the initial distance value from the carriage mounted straightness sensor at 58;

$I_x$ is the distance value from the carriage mounted straightness sensor taken at pavement distance sensor x where x=56, 54 or 52;

$b_o$, $c_o$ and $d_o$ are the distance readings of the member straightness sensors before calibration;

$d_b$ is the distance between the calibration alignment laser and pavement sensor 56;

$d_c$ is the distance between the calibration alignment laser and pavement sensor 54; and $d_d$ is the distance between the calibration alignment laser and pavement sensor 52 (i.e. the distance between sensor 52 and sensor 58).

These distance readings represent movement in the vertical direction only. The calibration is initiated by placing a calibration laser beam emitter on the ground and aligning the emitter so that its laser beam passes through the carriage mounted straightness sensor, regardless of the location of the carriage along the bearing member. It is important that the ground-mounted calibration laser should not move, nor be deflected in any way, during the calibration. Since the calibration laser emitter is not attached to the bearing member, its emitted laser beam is not influenced by the weight of the carriage. Moreover, atmospheric turbulence does not affect laser accuracy over short distances. Further, taking many readings and averaging these readings allows for better calibration. It is also important that the flat calibration plate of the calibration carriage should remain in a stable fixed position. This is assured by locking the plate in place, when the carriage is moved to its required position.

The use of the ground-mounted calibration laser is to ensure that all the pavement distance sensors will be "aligned in a straight line after calibration." This alignment is not by physical or mechanical adjustment, but by adjusting the output values of these pavement distance sensors, to provide the same effect as if they were physically adjusted. It is important to note that the pavement sensors need not be on the same vertical level with each other, they should, however, be colinear. This is achieved by the following procedure. Firstly, the carriage is moved to a calibration position beneath pavement sensor 58. The flat calibration plate is lowered and locked into place. Preferably, the plate should be in the middle of the operating range of the pavement sensor. Three calibration readings $b_o$, $c_o$, and $d_o$ are taken. The carriage is then moved to the next pavement sensor, sensor 56. Readings B, b and $I_b$ are taken. The carriage is then moved to the third pavement sensor 54. Readings C, c and $I_c$ are taken. Finally, the carriage is moved to the last pavement sensor 52, where readings D, d and $I_d$ are taken. Data gathering is now complete. Compensation factors for the effect of the weight of the carriage as it moves from sensor to sensor, are now computed. In order to do this, three data points are needed: a distance measurement from the pavement distance sensor, a measurement from the carriage mounted sensor, and a measurement from the reference sensor, for each of the pavement distance sensors.

1. $A_c = A$; (taken to be an end point which does not move); (X)

2. $B_c = (B + (b - b_o) + (I_b - I_a))$; (XI)

3. $C_c = (C + (c - c_o) + (I_c - I_a))$; and (XII)

4. $D_c = (D + (d - d_o) + (I_d - I_a))$. (XIII)

Clearly, if the sensor bearing member was completely rigid, and did not bend, then equations 2–4 would simplify since the differences calculated in parentheticals would equal zero.

$A_c$ and $D_c$ are taken as the end points of a desired straight line. The aim is to determine by how much $B_c$ and $C_c$ are offset from this straight line drawn between $A_c$ and $D_c$. The slope of this line is:

$$m = \frac{(A_d - D_c)}{d_d}$$ (XIV)

Using the equation for a straight line, (y=mx+k), the Y intercept, k, is set as $A_c$. Therefore, the final compensation applied to pavement sensors B and C is:

$B_{cfinal} = B_c - ((A_c - D_c)(d_b/d_d))$; (XV)

$C_{cfinal} = C_c - ((A_c - D_c)(d_c/d_d))$; (XVI)

$A_{cfinal} = A_c$; and (XVII)

$D_{cfinal} = D_c$. (XVIII)

The $B_{cfinal}$ and $C_{cfinal}$ are offsets applied to the real-time data from the pavement sensors.

In a second calibration method of the invention, a carriage calibration laser is fixedly attached to an end of the main bearing member 20 and measures the position of the calibration carriage as it is guided by a track on the member. With reference to FIG. 10, a carriage calibration laser 260 is mounted at one end of the main member 20. This laser emits a beam 262 (shown in dashed lines) that travels along the length of the main member, and is incident upon an intermediate target 264 on the carriage 200. This laser beam allows the measurement of the displacement of the carriage 200 in a direction laterally away from the main member 20. Thus, as the carriage traverses the length of the member, stopping under each pavement sensor to take calibration readings, the lateral position of the calibration carriage is also measured by carriage calibration laser 260. To facilitate understanding of this method, the following descriptive notation will be used:

A, B, C and D are the distance measurements from pavement distance sensors 58, 56, 54, and 52, respectively;

b, c and d are the distance values from the straightness sensors associated with pavement distance sensors 56, 54, and 52, respectively;

$R_n$ is the distance read at the end reference straightness sensor 270 when the calibration carriage is at pavement distance sensor n;

$R_o$ is the initial distance value from the end reference straightness sensor before calibration;

$I_a$ is the initial distance value from the carriage mounted straightness sensor at sensor 58;

$I_x$ is the distance value from the carriage mounted straightness sensor, where x=b, c or d, relating to sensors 56, 54 and 52, respectively;

$b_o$, $c_o$ and $d_o$ are the distance values of the member straightness sensors before calibration;

$d_b$ is the distance between the calibration alignment laser and pavement sensor 56;

$d_c$ is the distance between the calibration alignment laser and pavement sensor 54;

$d_d$ is the distance between the calibration alignment laser and pavement sensor 52; and L is the distance between the calibration alignment laser and reference target or alignment laser 270.

Calibration is initiated with the carriage at the first pavement sensor 58, where the alignment laser 260 is located. In this type of flat datum calibration, it is assumed that there are two points in space that do not move. These points are the middle of pavement sensor 52, and the reference target 270. Secondly, it is assumed that the flat calibration plate is completely immobile. This is assured by locking the plate in place. As with the ground-level laser alignment technique, the flat datum calibration technique is also based on aligning the pavement distance sensors in a straight line, not mechanically, but by adjusting output values. Also, the pavement sensors need not be level, but merely colinear with each other.

When the calibration carriage has been moved to pavement distance sensor 58, and the calibration plate is locked into place, the plate is preferably in the middle of the operating range of the pavement sensor. The following readings are taken and stored in a digital signal processor: $R_o$, $b_o$, $c_o$, $d_o$, A, and $I_o$. The carriage is then moved to pavement distance sensor 56, and the following readings are taken and stored: B, b, $I_b$, and $R_b$. Likewise, readings are taken at pavement sensor 54 and 52.

Once data gathering and storage has been accomplished, bending compensated values Ac, Bc, Cc, and Dc are determined:

1. Ac=A; (taken to be an end point which does not move); (XIX)
2. Bc=(B+(b−$b_o$)+($I_b$−$I_a$))−($d_b$/L)($R_o$−$R_b$); (XX)
3. Cc=(C+(c−$c_o$)+($I_c$−$I_a$))−($d_c$/L)($R_o$−$R_c$); and (XXI)
4. Dc=(D+(d−$d_o$)+($I_d$−$I_a$))−($d_d$/L)($R_o$−$R_d$). (XXII)

If the sensor bearing member 20 were infinitely rigid, and did not bend, the various $R_n$ would not be different from $R_o$. Thus, the equations 2, 3 and 4 would vanish. Likewise, if $B_o$, $c_o$ and $d_o$ were the same as b, c and d, respectively, then the first equations 2, 3 and 4 would simply equate to B, C and D, respectively.

Finally, the pending compensated values are "adjusted so that they are in a straight line". Again, this does not mean mechanical or physical adjustment, but adjusting outputs, by the same method described above relating to the ground-mounted laser calibration technique. Thus, the final compensation applied to pavement sensors 54 and 56 are:

$Bc_{final}$=Bc−((Ac−Dc)($d_b$/$d_d$)); and (XXIII)

$Cc_{final}$=Cc−((Ac−Dc)($d_c$/$d_d$)); (XXIV)

Since the two points representing distance measurements at sensors 52 and 58 are at the ends of the straight line:

$Ac_{final}$=Ac; and (XXV)

$Dc_{final}$=Dc. (XXVI)

The calibration carriage, as indicated above, includes an optical encoder 206 that records the position of the calibration carriage. This encoder sends an electrical signal to a digital signal processor 250 that keeps track of the position of the carriage. Thus, as the carriage 200 moves along the bearing rail 210, the optical encoder continuously tracks carriage movement. When the carriage is properly positioned beneath a pavement sensor, its progress is either halted automatically, by a signal from the digital signal processor that has recorded these predetermined stop positions, or by an operator, manually. The pavement sensor then measures the distance to the flat plate. This distance is used as an input to the calibration algorithms, given above.

In accordance with the invention, the shape of a pavement deflection basin may also be measured. This shape yields additional information about the stiffness of underlying layers. To measure the shape of the depression basin, pavement sensors and beam straightness sensors are added in pairs ahead of pavement sensors 52 and 54. For example, to measure the shape of a depression basin for a distance of six feet, at one foot intervals, six additional pavement sensors should be mounted ahead of sensor 52, and the same number ahead of pavement sensor 54. A beam straightness sensor is added above each additional pavement sensor. Thus, for each additional point in the deflection basin to be measured four additional pavement sensors are required: two pavement sensors and two beam straightness sensors. For example, FIG. 6 shows exemplary shape sensors 280 and 286 with associated beam straightness sensors 282 and 284, respectively.

Assume that the spacing between each pair of pavement distance sensors is nine feet, and also that shape sensors are spaced at one foot intervals ahead of each of the pavement distance sensors 52 and 54. These shape sensors incorporate the dual optical triangulation technology illustrated in FIG. 8. The six pairs of equations for the virtual heights for each of the six pairs of shape sensors are then:

$$h1 = \frac{8}{9} A - \frac{17}{9} B + C \qquad \text{(XXVII)}$$

$$h2 = \frac{7}{9} A - \frac{16}{9} B + C \qquad \text{(XXVIII)}$$

$$h3 = \frac{2}{3} A - \frac{5}{3} B + C \qquad \text{(XXIX)}$$

$$h4 = \frac{5}{9} A - \frac{14}{9} B + C \qquad \text{(XXX)}$$

$$h5 = \frac{4}{9} A - \frac{13}{9} B + C \qquad \text{(XXXI)}$$

$$h6 = \frac{1}{3} A - \frac{4}{3} B + C \qquad \text{(XXXII)}$$

$$h1' = \frac{8}{9} B - \frac{17}{9} C + D \qquad \text{(XXXIII)}$$

$$h2' = \frac{7}{9} B - \frac{16}{9} C + D \qquad \text{(XXXIV)}$$

$$h3' = \frac{2}{3} B - \frac{5}{3} C + D \qquad \text{(XXXV)}$$

-continued $$h4' = \frac{5}{9} B - \frac{14}{9} C + D \quad \text{(XXXVI)}$$

$$h5' = \frac{4}{9} B - \frac{13}{9} C + D \quad \text{(XXXVII)}$$

$$h6' = \frac{1}{3} B - \frac{4}{3} C + D \quad \text{(XXXVIII)}$$

Where $h_1$ refers to the measurement one foot ahead of pavement sensor 56, $h_2$ is two feet ahead, $h_n$ is n feet ahead.

While the rolling weight deflectometer of the invention may utilize a wheeled odometer to measure distance traveled, other tracking sensors, such as an optical correlator, may also be used. Such a correlator applies the principle of comparing two identical but time-shifted signals reflected from a surface. When the signals match, the amount of time between the signals is known. When the distance between the two sensors is known, the optical correlator can be used as an odometer. This is achieved by the correlator comparing the signals obtained as the deflectometer traverses the pavement. When the correlator finds a high degree of correlation between signals this indicates readings from successive sensors taken for the same sample of pavement. Since the distance between sensors is known, and the time period between the two correlated signals is known, the velocity of the deflectometer can be calculated as distance divided by time.

The use of the correlator as an odometer also assists in the detection of sideways movement or "crabbing" of the deflectometer. In this event, successive pavement distance sensors will not pass over the identical pavement, so that correlation between signals from the sensors will be significantly reduced. This reduced correlation is a warning to the operator that the deflectometer is crabbing and not traveling in such a manner as to allow successive pavement distance sensors to "see" substantially the same patch of pavement.

The rolling weight deflectometer of the invention may be optionally equipped with an infrared temperature sensor, located near a pavement sensor and oriented to read the temperature of the pavement surface. Preferably, the sensor is calibrated for pavement emissivity so that it measures the pavement temperature in real-time. Information from the infrared sensor may be transmitted and stored in a digital signal processor.

The rolling weight deflectometer of the invention may also be supplied with an optional satellite navigation receiver to provide accurate information regarding the position of the rolling weight deflectometer on the earth's surface. This information may also be stored in a digital signal processor so that pavement deflection data are effectively tagged to indicate their location on the earth's surface.

The instantaneous applied load of the rolling weight deflectometer may optionally be measured with a load cell. This will produce a more accurate indication of pavement modulus by taking into account actual instantaneous load, not the static load only. Moreover, acceleration may be instantaneously monitored by an accelerometer mounted on the load platform to measure instantaneous load, if static load is known. This instantaneous load information may also be relayed to a digital signal processor for storing and use in calculating pavement deflection.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A device for measuring the deflection of pavement under an applied load, the device comprising:

(a) a longitudinally extending member mounted on a mobile carriage;

(b) a load platform mounted on the carriage in the vicinity of a first end of the longitudinally extending member;

(c) a load wheel rotatably mounted on an axle, said axle mounted near the first end of the longitudinally extending member, below the load platform, and in load bearing communication with said platform;

(d) a first distance sensor mounted on the longitudinally extending member, near the load wheel to measure the depth of a deflection basin created by the wheel in pavement;

(e) at least one additional distance sensor mounted on the longitudinally extending member at a predetermined distance from the first sensor to measure distance to pavement below the sensor, the predetermined distance sufficiently large so that distance measurements of the additional sensor are substantially unaffected by a deflection basin of the load wheel;

(f) an alignment laser beam emitter mounted on the longitudinally extending beam, the laser beam emitter aligned to direct a laser beam along the longitudinally extending beam the laser beam providing a substantially invariant reference for determining bending deviation of the longitudinally extending beam; and (g) at least two beam straightness sensors mounted at spaced apart locations along the longitudinally extending beam, each straightness sensor aligned to intercept and deflect a portion of a laser beam emitted from the alignment laser beam emitter to allow measurement of bending deviation of the longitudinally extending member.

2. The device of claim 1, wherein each beam straightness sensor comprises a partially laser-reflective mirror angled to deflect a portion of an incident laser bean emitted from said alignment laser beam emitter and to allow passage of a remaining portion of the incident laser beam and further comprises a position sensitive photodetector means spaced apart from the mirror and positioned for receiving the deflected portion of the incident laser beam so that the point of incidence of the deflected portion of the laser beam on the position sensitive photodetector means is indicative of bending of the longitudinally extending beam.

3. The device of claim 1, wherein the first distance sensor comprises:

(a) a laser beam emitter enclosed within a housing;

(b) a window in the housing aligned with the laser beam emitter so that a laser beam from the emitter will pass through the window;

(c) a first optical lens mounted on one side of the emitter with an optical axis aligned to focus reflected laser beams entering the housing through the window; and a second lens, mounted on the opposite side of the laser beam emitter, the second lens having an optical axis aligned to focus laser beams entering the housing through the window; and (d) a first photodetector mounted behind the first lens to intercept focused laser beams passing through the first lens; and a second photodetector mounted behind the second lens to intercept focused laser beams passing through the second lens.

4. The device of claim 3 wherein the first distance sensor further comprises a digital signal processor in electrical communication with the first and second photodetectors.

5. The device of claim 1, further comprising:

(a) a calibration carriage mounted on a rail extending substantially along the length of the horizontal member, the carriage able to traverse the distance between the first and at least one additional distance sensor; and (b) a flat calibration plate mounted on the calibration carriage, the plate oriented perpendicular to and able to reflect laser beams emitted from the first and second distance sensors.

6. The device of claim 1, further comprising at least one pair of deflection basin shape sensors, the shape sensors mounted on the horizontal member and each comprising a laser beam emitter and at least two position-sensitive photodetectors, one mounted on either side of the laser beam emitter to intercept reflected laser beams, whereby the shape sensors allow measurement of the shape of a deflection basin created by the load wheel of the device.

7. A rolling weight deflectometer for measuring the deflection of pavement under an applied load, the device comprising:

(a) a longitudinally extending member mounted in a mobile carriage;

(b) a load platform mounted on the carriage in the vicinity of one end of the longitudinally extending member;

(c) a load wheel rotatably mounted on an axle, said axle mounted near the first end of the longitudinally extending member, and in load bearing communication with said platform;

(d) four pavement distance sensors mounted on the longitudinally extending member, a first of the pavement distance sensors mounted near the load wheel to measure the depth of a deflection basin created by the wheel in pavement, and the other pavement distance sensors spaced apart at predetermined intervals along the longitudinally extending member;

(e) an alignment laser beam emitter mounted on the horizontal member the laser beam emitter aligned to direct a reference laser beam along the longitudinally extending beam the laser beam providing a reference for determining bending of the longitudinally extending beam; and (f) a plurality of beam straightness sensors, each beam straightness sensor being associated with a different one of the pavement distance sensors, each beam straightness sensor aligned to intercept and deflect a portion of the reference laser beam emitted from the alignment laser beam emitter to allow measurement of bending deviation of the longitudinally extending member.

8. The deflectometer of claim 7, wherein the pavement distance sensors each comprise:

(a) a laser beam emitter enclosed within a housing;

(b) a window in the housing aligned with the laser beam emitter so that a laser beam from the emitter will pass through the window;

(c) a first optical lens mounted on one side of the emitter with optical axis aligned to focus reflected laser beams entering the housing through the window; and a second optical lens, mounted on the opposite side of the laser beam emitter, the second lens having an optical axis aligned to focus laser beams entering the housing through the window; and (d) a first photodetector mounted behind the first lens to intercept focused laser beams passing through the first lens; and a second photodetector mounted behind the second lens to intercept laser beams passing through the second lens.

9. The deflectometer of claim 8 wherein the first distance sensor further comprises a digital signal processor in electrical communication with the first and second photodetectors.

10. The deflectometer of claim 7 further comprising at least one pair of basin shape sensors, these shape sensors mounted on the horizontal member and each comprising a laser beam emitter and at least two position-sensitive photodetectors, one mounted on either side of the laser beam emitter, the photodetectors in electrical communication with a digital signal processor, whereby the shape sensors allow measurement of the shape of a deflection basin created by the load wheel of the device.

11. A method of compensating for errors introduced into measurements of pavement deflection in a rolling wheel deflectometer comprising a load wheel and a longitudinal member whereon is mounted a plurality of spaced apart pavement distance sensors, where the errors are due to bending of the member causing vertical displacement of the pavement distance sensors, the method of comprising:

(a) emitting a reference laser beam to pass in the vicinity of each of the pavement distance sensors and provide a substantially invariant reference line extending along the longitudinal member;

(b) deflecting a portion of the reference laser beam to a plurality of straightness sensors that are spaced apart from one another and are mounted to the longitudinal member;

(c) determining the distance between the reference laser beam and each straightness sensor to detect bending of the longitudinal member; and (d) incorporating the distance from each straightness sensor to the reference laser beam into a measurement from an associated distance sensor measuring distances to the pavement.

12. The device of claim 1, wherein the number of beams straightness sensors is equal to the number of distance sensors and a beam straightness sensor is mounted to the longitudinal extending beam at a location proximate each distance sensor.

13. The device of claim 1, wherein:

(a) the number of beam straightness sensors is one less than the number of distance sensors;

(b) the alignment laser beam emitter is mounted proximate one of the distance sensors; and (c) each straightness sensor is mounted proximate a different one of the remaining distance sensors.

14. The rolling weight deflectometer of claim 7 wherein the plurality of beam straightness sensors consists of four beam straightness sensors that are associated on a one-to-one basis with the four pavement distance sensors, each beam straightness sensor being mounted in longitudinal proximity to its associated pavement distance sensor.

15. The rolling weight deflectometer of claim 14 wherein each beam straightness sensor is mounted proximate its associated pavement distance sensor so that the total distance traveled by the intercepted and deflected reference laser beam is substantially equal to the distance between the alignment laser beam emitter and the associated pavement distance sensor.

16. The device of claim 7, wherein:

(a) the number of beam straightness sensors is one less than the number of pavement distance sensors;

(b) the alignment laser beam emitter is mounted proximate one of the pavement distance sensors; and (c) each straightness sensor is mounted proximate a different one of the remaining pavement distance sensors.

* * * * *

UNITED STATES PATENT AND TRADEMARK OFFICE
Certificate

Patent No. 5,753,808                                            Patented: May 19, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Roger F. Johnson, Bellevue, WA; Phillip D. Bondurant, Kent, WA; and Mark H. Marvin, Tacoma, WA.

Signed and Sealed this Thirtieth Day of May, 2000.

HEZRON E. WILLIAMS
*Supervisory Patent Examiner*
Art Unit 2856